United States Patent
McDonough et al.

(10) Patent No.: US 9,361,486 B2
(45) Date of Patent: Jun. 7, 2016

(54) DETERMINING A PROFILE FOR AN AIRCRAFT PRIOR TO FLIGHT USING A FUEL VECTOR AND UNCERTAINTY BANDS

(71) Applicant: AeroData, Inc., Scottsdale, AZ (US)

(72) Inventors: Terry L. McDonough, Scottsdale, AZ (US); Magnus Kernast, Glendale, AZ (US); Carlos E. Padilla, Scottsdale, AZ (US); Shane C. Tillotson, Gilbert, AZ (US)

(73) Assignee: AERODATA, INC., Scottsdale, AZ (US)

( * ) Notice: Subject to any disclaimer, the term of this patent is extended or adjusted under 35 U.S.C. 154(b) by 154 days.

(21) Appl. No.: 14/088,682

(22) Filed: Nov. 25, 2013

(65) Prior Publication Data
US 2015/0148992 A1    May 28, 2015

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G06G 7/70* | (2006.01) |
| *B64F 5/00* | (2006.01) |
| *G01M 1/12* | (2006.01) |

(52) U.S. Cl.
CPC .. *G06G 7/70* (2013.01); *B64F 5/00* (2013.01); *G01M 1/122* (2013.01); *G01M 1/125* (2013.01); *G01M 1/127* (2013.01)

(58) Field of Classification Search
CPC ........ B64C 17/10; B64D 43/00; G01G 19/07; G01M 1/125; G01M 1/127; B64F 5/00; G06G 7/70; G08G 5/003

USPC .......................................................... 701/3, 29
See application file for complete search history.

(56) References Cited

U.S. PATENT DOCUMENTS

| | | | |
|---|---|---|---|
| 3,701,279 A | 10/1972 | Harris et al. | |
| 4,110,605 A | 8/1978 | Miller | |
| 4,545,019 A | 10/1985 | Glover | |
| 4,935,885 A | 6/1990 | McHale et al. | |
| 6,275,769 B1 | 8/2001 | Willis | |
| 6,308,131 B1 | 10/2001 | Fox | |
| 6,650,974 B2 | 11/2003 | Chamas et al. | |
| 6,913,228 B2 * | 7/2005 | Lee et al. | 244/135 C |
| 6,923,375 B2 | 8/2005 | Stefani | |
| 8,068,975 B2 | 11/2011 | Jensen et al. | |
| 8,226,040 B2 * | 7/2012 | Neto | 244/135 C |
| 8,234,068 B1 * | 7/2012 | Young et al. | 701/528 |

(Continued)

OTHER PUBLICATIONS

US Department of Transportation, Federal Aviation Administration (FAA), Advisory Circular 120-27E-Aircraft Weight and Balance Control, Jun. 10, 2005, Washington, D.C., 71 pages.

*Primary Examiner* — Jason Holloway
*Assistant Examiner* — Rachid Bendidi
(74) *Attorney, Agent, or Firm* — Greenberg Traurig, LLP (57) ABSTRACT

A weight and center-of-gravity profile for an aircraft is determined prior to flight. An uncertainty band is determined for each of a plurality of points along a fuel vector for the planned flight. Each of the points along the fuel vector is compared to a predetermined flight limit (e.g., an FAA certified envelope). This comparison is used to decide whether the profile is suitable for flight of the aircraft. If so, an indication is provided to a user (e.g., on a display or by a text message) that the profile is suitable and the aircraft is ready for flight.

13 Claims, 8 Drawing Sheets

(56) References Cited

U.S. PATENT DOCUMENTS

| | | | |
|---|---|---|---|
| 2005/0051666 A1* | 3/2005 | Lee et al. | 244/10 |
| 2009/0192846 A1 | 7/2009 | Stefani | |
| 2010/0044515 A1* | 2/2010 | Neto | 244/135 C |
| 2010/0063718 A1 | 3/2010 | Schmidt | |
| 2013/0192903 A1* | 8/2013 | Dubois | 177/1 |
| 2015/0120091 A1* | 4/2015 | Demy | 701/3 |

* cited by examiner

DETERMINING A PROFILE FOR AN AIRCRAFT PRIOR TO FLIGHT USING A FUEL VECTOR AND UNCERTAINTY BANDS

FIELD OF THE TECHNOLOGY

At least some embodiments disclosed herein relate to data processing systems in general, and more particularly, but not limited to, systems for determining a profile (e.g., a center-of-gravity profile) for an aircraft prior to flight based on physical characteristics of the aircraft and its load.

BACKGROUND

Accurately calculating an aircraft's weight and center of gravity (CG) before flight is necessary to comply with certification limits established by the aircraft manufacturer for a given aircraft. These limits include both weight and CG limits. By complying with these limits and operating under the procedures established by the aircraft manufacturer, an operator is able to meet the weight and balance requirements specified in the Airplane Flight Manual (AFM). Typically, an operator calculates takeoff weight by adding the operational empty weight (OEW) of the aircraft, the weight of the passengers, cargo payload, and the weight of fuel. When using average weights for passengers and bags, the operator must be vigilant to ensure that the weight and balance control program reflects the reality of aircraft loading.

To comply with FAA regulations, each operator must construct a "loading envelope" applicable to each aircraft being operated. The envelope will include all relevant weight and balance limitations. It will be used to ensure that the aircraft is always operated within appropriate weight and balance limitations, and will include provisions to account for the loading of passengers, fuel, and cargo; the in-flight movement of passengers, aircraft components, and other loaded items; and the usage or transfer of fuel and other consumables. The operator must be able to demonstrate that the aircraft is being operated within its certificated weight and balance limitations.

In long-established prior approaches, an operator curtails the manufacturer's loading limitations to account for loading variations and in-flight movement that are encountered in normal operations. For example, if passengers are expected to move about the cabin in flight, the operator must curtail the manufacturer's CG envelope by an amount necessary to ensure that movement of passengers does not shift the aircraft's CG outside its certified envelope. If the aircraft is loaded within the new, curtailed envelope, it will always be operated within the manufacturer's envelope, even though some of the loading parameters, such as passenger seating location, are not precisely known.

In some cases an aircraft may have more than one loading envelope for preflight planning and loading. Each envelope must have the appropriate curtailments applied for those variables that are expected to be relevant for that envelope. For example, an aircraft might have separate takeoff, in-flight, and landing envelopes. Passengers are expected to remain seated in the cabin during take-off or landing. Therefore, the takeoff and landing envelope does not need to be curtailed for passenger movement.

Upon determination of the curtailed version of each envelope, the most restrictive points (for each condition the operator's program will check) generated by an "overlay" of the envelopes will form the aircraft operational envelopes. By restricting operation to these "operational envelopes," compliance with the manufacturer's certified envelope will be ensured in all phases of flight, based upon the assumptions within the curtailment process.

Some examples of common loading curtailments to the manufacturer's loading envelope are now provided. Operators using an approved weight and balance control program include curtailments appropriate to the operations being conducted. Each of the items mentioned below is an example of a single curtailment factor. The total curtailment of the manufacturer's envelope is computed by combining the curtailments resulting from each of these factors.

As a first example, the operator accounts for the seating of passengers in the cabin. The loading envelope does not need to be curtailed if the actual seating location of each passenger is known. If assigned seating is used to determine passenger location, the operator must implement procedures to ensure that the assignment of passenger seating is incorporated into the loading procedure.

If the actual seating location of each passenger is not known, the operator may assume that all passengers are seated uniformly throughout the cabin or a specified subsection of the cabin. If this assumption is made, the operator curtails the loading envelope to account for the fact that the passenger loading may not be uniform. The curtailment may make reasonable assumptions about the manner in which people distribute themselves throughout the cabin.

As a second example, the operator's curtailed loading envelope accounts for the effects of fuel. The following are examples of several types of fuel-related curtailments:

(1) Fuel density. A certain fuel density may be assumed and a curtailment included to account for the possibility of different fuel density values. Fuel density curtailments only pertain to differences in fuel moment caused by varying fuel volumes, not to differences in total fuel weight.

(2) Fuel movement. The movement or transfer of fuel in flight.

(3) Fuel usage in flight. The burning of fuel may cause the CG of the fuel load to change. The effect of fuel burning down to the required reserve fuel or to an acceptable fuel amount established by the operator should be accounted for. A curtailment is included to ensure that this change does not cause the CG of the aircraft to move outside of the acceptable envelope.

As another example, the operator's curtailed CG envelope accounts for the effects of galley and lavatory fluids. These factors include such things as use of potable water in flight, and movement of water or lavatory fluids.

The operational envelope also accounts for the in-flight movement of passengers, crew, and equipment. This may be done by including a curtailment equal to the moment change caused by the motion being considered. It may be assumed that all passengers, crew, and equipment are secured when the aircraft is in the takeoff or landing configuration. Standard operational procedures may be taken into account.

Examples of items that can move during flight include the following:

(1) Flight deck crew members moving to the lavatory.
(2) Flight attendants moving throughout the cabin.
(3) Service carts moving throughout the cabin.
(4) Passengers moving throughout the cabin.
(5) Passengers moving to the lavatory.

If the manufacturer has not already done so, the operator also accounts for the movement of landing gear, flaps, wing leading edge devices, or any other moveable components of the aircraft.

SUMMARY OF THE DESCRIPTION

Systems and methods to determine a profile for an aircraft prior to flight based on physical characteristics of the loaded aircraft (e.g., at takeoff, in-flight, and landing) are described herein. Some embodiments are summarized in this section.

In one embodiment, a method implemented in a data processing system includes: determining, via a computing apparatus, a profile for an aircraft prior to flight, the determining of the profile comprising determining a respective uncertainty band for each of a plurality of points along a fuel vector for the flight; comparing, via the computing apparatus, for each respective point of the points along the fuel vector, the profile to a predetermined flight limit (e.g., an in-flight limit, a takeoff limit, or a landing limit); determining based on the comparing whether the profile is suitable for flight of the aircraft; and providing an indication for a user that the profile is suitable.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The operation of an aircraft must adhere to many limitations (e.g., FAA or other regulatory agency certification limits, or limits imposed by the manufacturer). Some of these limits pertain to the aircraft weight and its center of gravity (CG).

Figure 1:
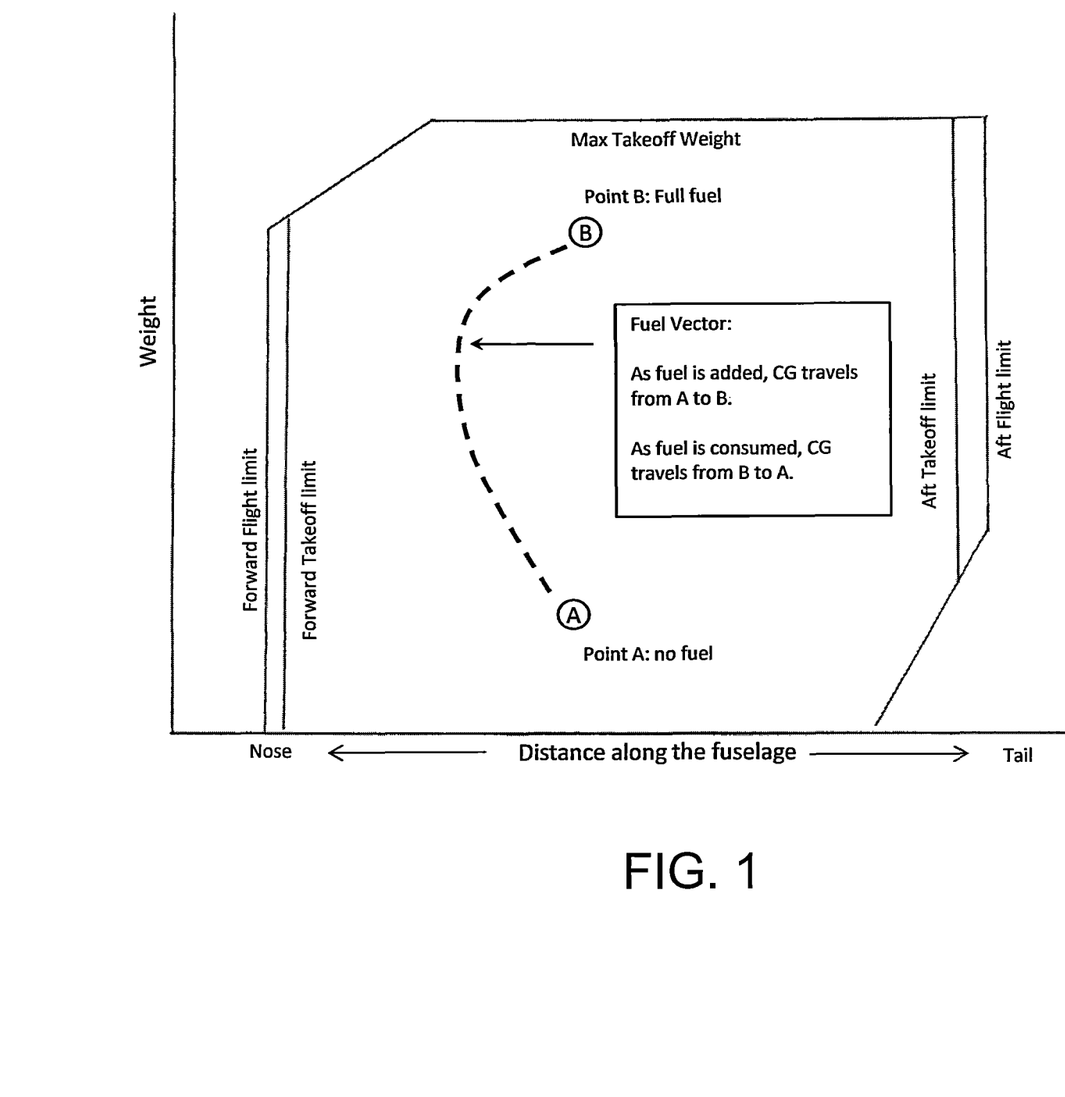
FIG. 1 shows an example of a certified weight-CG envelope with a fuel vector that will remain within the envelope during flight.

FIG. 1 shows a typical set of limitations, expressed in the form of the weight-CG envelope, certified by the authorities (e.g., the FAA in the US), and therefore called the certified weight-CG envelope, or simply the certified envelope. Typically, there are limitations on CG applicable to the conditions of takeoff and flight, such as shown in FIG. 1. There may be other limitations as well.

FIG. 1 also depicts the path that the CG follows as fuel is loaded, going from point A to point B, or as fuel is consumed (going from point B to A, such as occurs in flight). This path is described herein as the "fuel vector". FIG. 1 illustrates the case where the fuel vector remains within the certified weight-CG envelope during flight.

Figure 2:
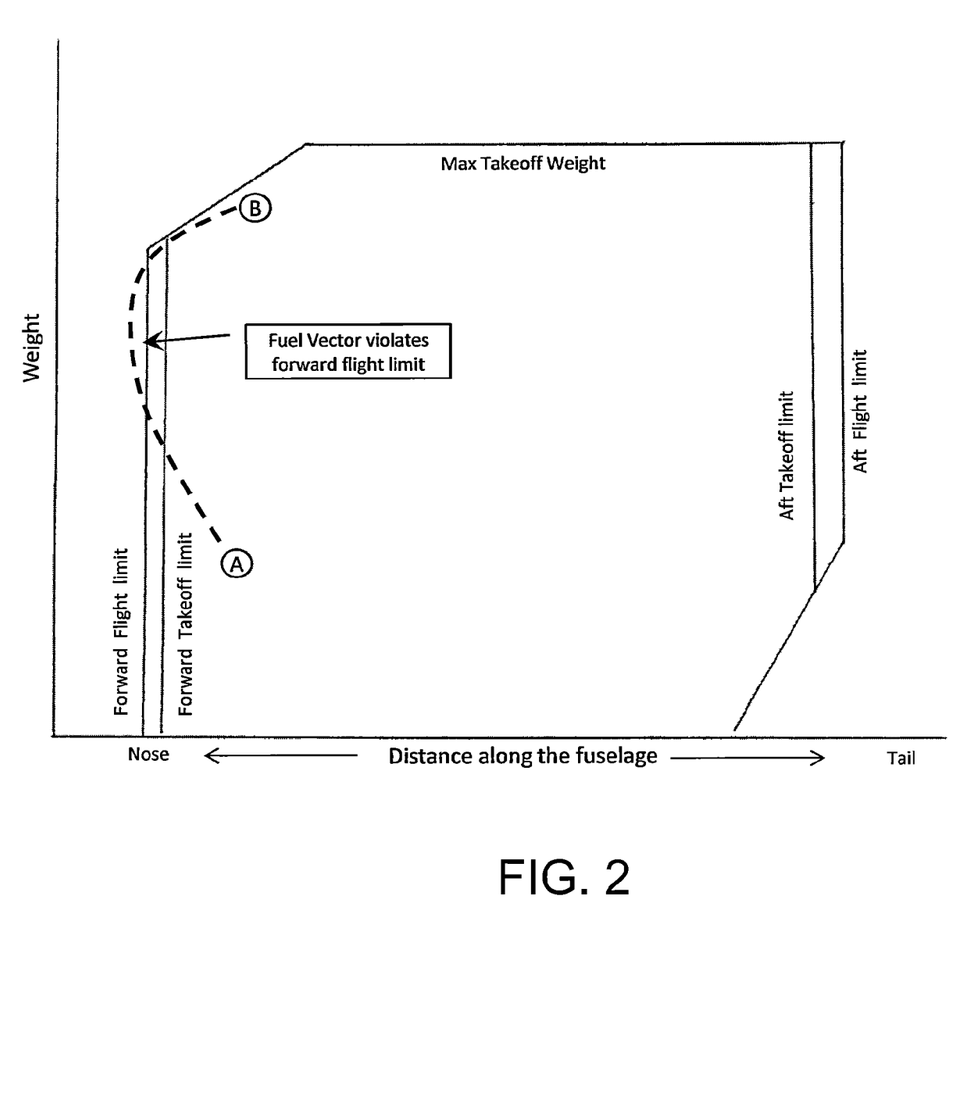
FIG. 2 shows the certified weight-CG envelope of FIG. 1 with a fuel vector that will violate the forward flight limit of the envelope during flight.

Besides the effect of fuel, there are other processes that may contribute to changing the location of the aircraft CG. Some examples include the following: flight attendants and passengers moving about the cabin, the extension of flaps, and the retraction of the landing gear. All these processes and effects may contribute to the uncertainty of the location of the aircraft CG during flight. FIG. 2 shows the certified weight-CG envelope of FIG. 1 with a fuel vector that will violate the forward flight limit of the certified envelope during flight.

In traditional approaches, to prevent certified envelope violations, such as the one shown in FIG. 2, operators reduce, or curtail the envelope to a smaller size, and load the aircraft within the limitations of this curtailed envelope. Loading the aircraft within the curtailed envelope guarantees that the certified envelope will not be violated, thereby complying with the regulations. In particular, fuel consumption (i.e., fuel usage in flight) is one of the allowances used to determine curtailment in this traditional approach.

The US Federal Aviation Administration (FAA) publishes, for example, Advisory Circular 120-27E (AC 120-27E) to "provide operators with guidance on how to develop and receive approval for a weight and balance control program for aircraft operated under Title 14 of the Code of Federal Regulations (14 CFR)". The traditional approach of curtailing the envelope to accommodate the CG excursions inherent in the operation of an aircraft was developed to assist the operator in developing a paper-based solution to the weight and balance problem. This paper-based solution is commonly referred as the load sheet, or trim sheet. The advent of digital computers merely allowed the automation of this same paper-based solution to the weight and balance problem.

In the present disclosure below, at least one embodiment provides a method to accommodate variations in an aircraft's center of gravity (CG) that may occur during the operation of the aircraft. Those CG variations are compared to applicable certified limitations for the aircraft in order to establish compliance prior to takeoff. Traditionally, this accommodation was done with calculations done off-line by technical personnel, and then submitted for application to the load of a specific flight. In contrast, some embodiments discussed below calculate the anticipated CG variations in real-time, as the aircraft load is being assessed (prior to takeoff), and compare the variations to the limitations applicable to the flight under consideration. Available loading margins are displayed, and violations are flagged or otherwise indicated to an operator. Typical embodiments may be used to adhere to FAA AC 120-27E (or other similar applicable regulations) using the novel approach described below.

In one embodiment, the need for the curtailed envelope (along with the extensive calculations needed to produce it) is eliminated by configuring a CG profile for the flight (i.e., a fuel vector combined with the uncertainty bands applicable for that flight, as discussed in more detail below). The CG profile is calculated, in real-time prior to takeoff, for each applicable flight limitation (e.g., takeoff, in-flight, landing). A flight generally includes several portions. There is a takeoff portion, an in-flight portion, and a landing portion. There typically is one or more different flight limits associated with each of these portions of the flight. For example, the CG profile, or only the part of the CG profile corresponding to takeoff, is compared to a takeoff limit (e.g., a portion of a certified envelope that corresponds to takeoff). Similarly, the CG profile, or only a part of the CG profile corresponding to landing, may be compared to a landing limit. Finally, all or only applicable parts of the CG profile may be compared to one or more limits that apply during flight (i.e., the in-flight portion of the flight).

For the in-flight limits, only the effects associated with that condition are applied: movement of passengers and crew, etc. For landing, only the effects associated with landing are applied: extension of flaps, and movement of cabin crew, etc. It should be noted that the curtailed envelope of the traditional approach is no longer necessary. After the CG profile is determined for a particular flight, the CG profile is checked against the certified, predetermined limits to determine compliance (i.e., suitability of the profile is determined indicating the aircraft is ready for flight).

Figure 3:
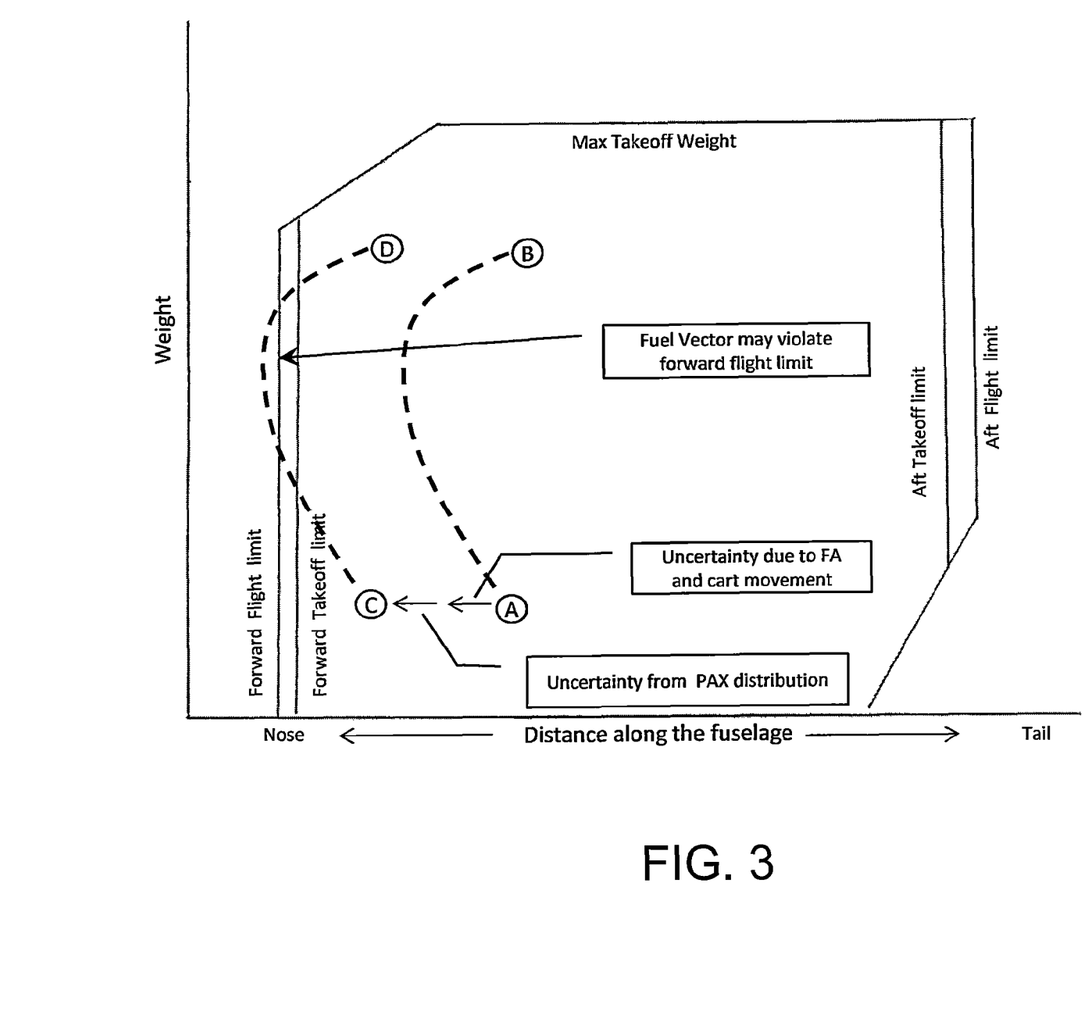
FIG. 3 shows the certified weight-CG envelope of FIG. 1 illustrating uncertainty in fuel vector position due to movement of flight attendants, cart movement, and/or uncertainty from passenger distribution.

FIG. 3 shows the certified weight-CG envelope of FIG. 1 illustrating uncertainty in fuel vector position due to movement of flight attendants, cart movement, and/or uncertainty from passenger distribution. In various embodiments, these uncertainties are accumulated as described below in order to calculate so-called "uncertainty bands". The uncertainty bands are used in conjunction with the fuel vector to obtain the CG profile. The CG profile is then used to assess flight readiness by comparing the CG profile to the predetermined flight limits (e.g., the certified envelope).

Figure 4:
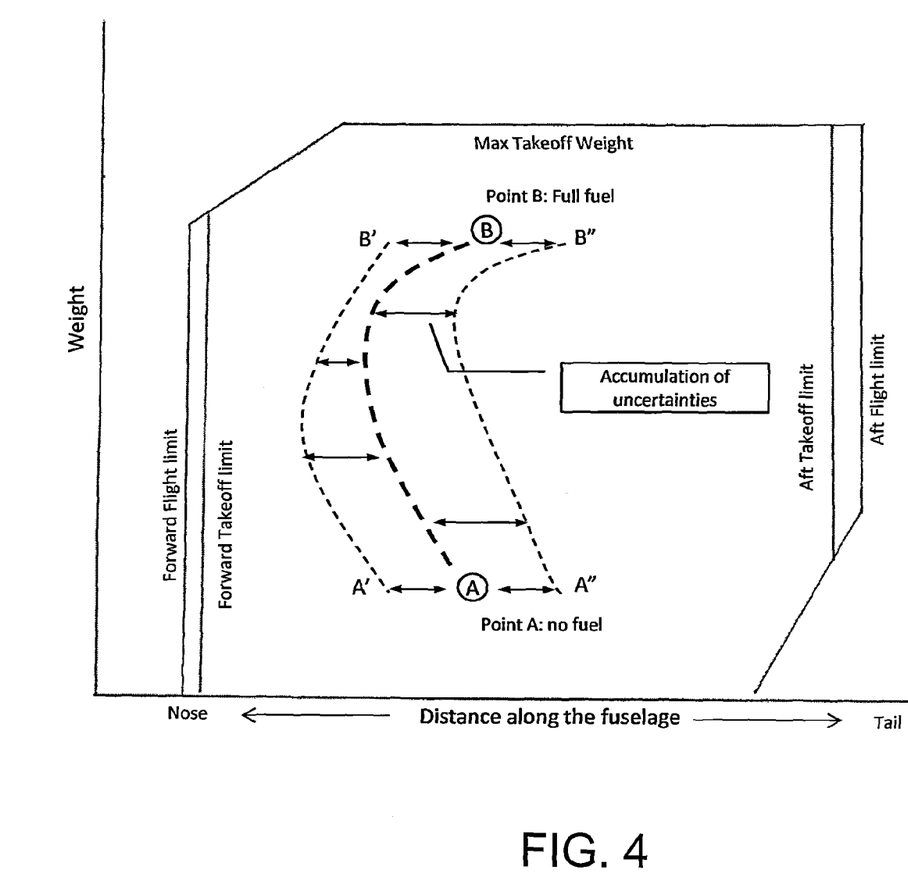
FIG. 4 shows a fuel vector (presented in weight—CG space) with uncertainty bands determined based on accumulation of uncertainties associated with physical characteristics of a loaded aircraft, according to one embodiment.
Figure 5:
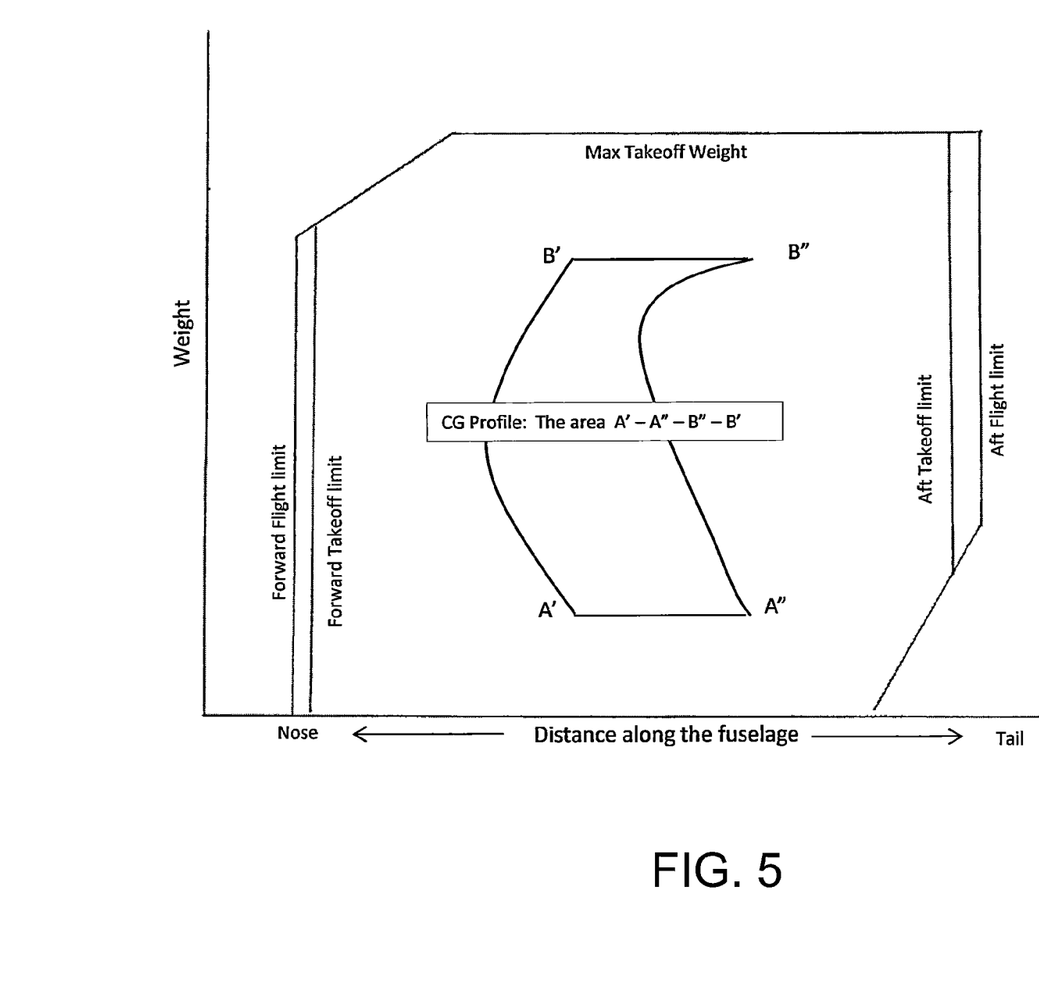
FIG. 5 shows a CG profile (presented in weight—CG space) as determined using the fuel vector and uncertainty bands of FIG. 4, according to one embodiment.

In various embodiments, the CG profile for the flight is made up of three curves: the fuel-induced CG path (or fuel vector), and the forward and aft edges of the profile. These edges are the result of adding the prescribed moment allowances (e.g., as illustrated in FIGS. 4 and 5 discussed below). They constitute the forward and aft uncertainties that are located forward and aft of the fuel-induced CG path (fuel vector). For example, for any given point on the fuel vector, these forward and aft uncertainties together provide an uncertainty band for that point (e.g., see FIG. 9 discussed below).

FIG. 4 shows a fuel vector (presented in weight—CG space) with a region (or area) of uncertainty determined based on accumulation of uncertainties associated with physical characteristics of the aircraft (e.g., physical processes that may occur during flight), according to one embodiment. Uncertainties are illustrated in FIG. 4 as horizontal, double-sided arrows and account for accumulation of uncertainties due to physical characteristics of an aircraft that change (or may change) during flight. The uncertainty bands (such as illustrated, for example, in FIG. 9) may be calculated for various points along the fuel vector (e.g., at every incremental increase of a certain fuel weight or fuel volume). For example, beginning with a zero-fuel weight (ZFW) (e.g., 126,704 lb.) and ZFWCG (e.g., 766.00"), one can add fuel in increments of, for example, 100 USG, while at the same time calculating the corresponding moment (e.g., assuming a fuel density of 6.7 lb/USG) with the fuel arm corresponding to the fuel volume added.

In one embodiment, dynamically-determined aircraft CG locations are used, as expanded by allowances made for various CG-shifting effects (i.e., allowances are accumulated to define an uncertainty band around each of several points along the fuel vector). The resulting ensemble, the expanded fuel vector (or CG profile), is then subjected to the limitations imposed by the certified envelope. These allowances are intended to account for all foreseen processes that may shift the CG of the aircraft under normal operations, for example, as prescribed by the Airplane Flight Manual (AFM), and the Weight and Balance Manual (WBM), or equivalent.

In this embodiment, during normal operation, the aircraft will experience changes in CG location associated with several processes. To avert violating the certified envelope, it is necessary to identify and quantify these processes in terms of moment allowances. These are the moments generated by the CG shift associated with that process (or physical characteristic). Some exemplary, applicable moment allowances are described below:

(1) Fuel Density Allowance. Fuel density is assumed to vary from, for example, 6.3 to 7.1 lb/USG. The fuel allowance accounts for the error in CG introduced by values in fuel density within this range.

(2) Fuel Burn Allowance. It should be noted that the CG changes that arise from fuel consumption are not subject to an allowance. Instead, the fuel vector is compared dynamically to the applicable CG limitations (certified envelope) to establish that the aircraft will be in compliance with the certified envelope throughout the flight.

(3) Water Usage Allowance. Accounts for the transfer of water from the potable water storage tank to the lavatory waste tank during flight as passengers use the lavatory.

(4) Waste Water Allowance. The waste water allowance considers the water from the potable water storage tank that is discharged overboard during flight as passengers use the lavatory.

(5) Passenger Seating Allowance. In one specific example, passenger seating distribution may be assumed to reflect an industry-standard window-aisle-remaining seat assignment scheme; the passenger seating allowance is thus dependent on the actual passenger count. In other embodiments, the passenger allowance can be determined in many other ways.

(6) Passenger Movement Allowance. The movement of passengers throughout the cabin during flight generates moments that depend on the passenger location and the location of the lavatories.

(7) Cabin Crew Movement Allowance. Similarly, the movement of the cabin crew throughout the cabin during flight generates moments that depend on the assigned seat for the flight attendant and various destinations in the cabin. No catering carts are moved in the cabin during flight.

(8) Cargo Distribution Allowance. The cargo loading allowance accounts for a possible non-uniformly distributed cargo load. In one specific example, cargo is assumed to be loaded from one end of the compartment towards its center, for example at a rate of 10 lb. per cubic foot, until all the items have been loaded, limited by either the maximum weight capacity or the maximum volume capacity of that compartment. The resulting cargo load will generate a moment that is different than the moment of the same cargo load if it were loaded uniformly throughout the cargo compartment. The difference between these two moments is the cargo allowance for that compartment. The variation of moment as weight is loaded will eventually reach a maximum allowance. This maximum allowance occurs when the bin is calculated to be half full by volume. As additional weight is loaded above the weight where the maximum allowance is reached, the maximum allowance will be applied. Using the root sum of the squares (RSS) method, the allowance of each compartment is added together to calculate the total forward and aft cargo allowance. In other embodiments, the cargo distribution allowance can be determined in many other ways (9) Flap Deployment Allowance. The moment generated by the deployment of flaps/slats is used as the allowance.

(10) Landing Gear Retraction Allowance. Similarly, the moment generated by retraction of the landing gear is used as the allowance.

Figure 9:
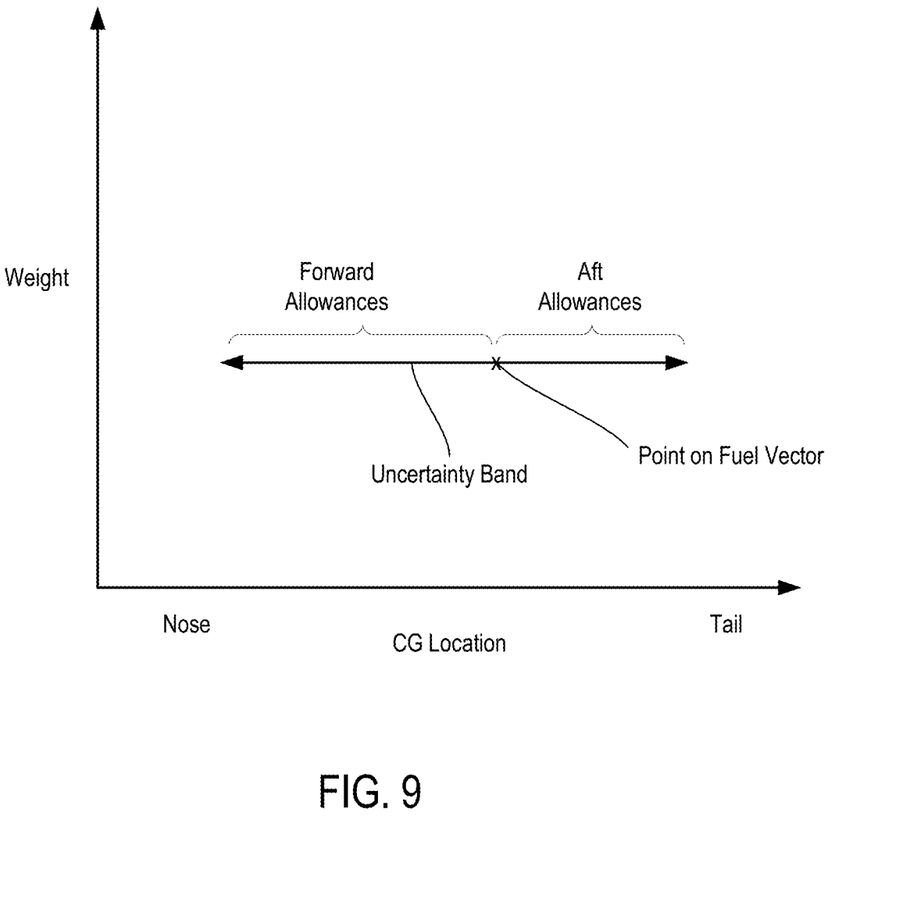
FIG. 9 shows an uncertainty band for a given point on a fuel vector, where the uncertainty band is determined based on accumulated forward and aft moment allowances, according to one embodiment.

FIG. 5 shows a CG profile (presented in weight—CG space) as determined using the fuel vector and uncertainty bands of FIG. 4, according to one embodiment. The CG profile is defined by the area located within the perimeter A'-A''-B''-B', which is established by applying the uncertainties to forward and aft sides of the fuel vector, as illustrated in FIGS. 4 and 5. In other words, each uncertainty band (e.g., as shown in FIG. 9) extends from one side of the perimeter of the CG profile through a given point on the fuel vector to the other, opposite side of the perimeter of the CG profile.

The certified envelope establishes the limits within which the weight and CG of the aircraft have to lie at any time during the operation of the aircraft; however, CG-shifting processes introduce uncertainty to the actual location of the aircraft CG. Both the ZFW point and the takeoff weight (TOW) point have uncertainties associated with the location of their corresponding CGs. In the case of the TOW point, the uncertainty extends towards the forward edge of the envelope away from the fuel vector, and also towards the rear edge away from the fuel vector. This situation is similar for the ZFW point. These uncertainties are made up of the accumulated allowances (discussed above) associated with a given point on the fuel vector.

As fuel is loaded in the aircraft, the aircraft CG moves from the zero-fuel condition to the takeoff condition along the fuel vector. In some cases, normal fuel consumption causes the aircraft CG to travel along the same curve, in reverse, until the main tanks reach a low-fuel condition. However, it should be noted that in other cases, there may be alternate paths for loading and unloading fuel. In general, the fuel vector does not always have the same shape for two different flights, and the fuel vector may also depend on whether there are inoperative components or not, such as a fuel pump.

Each point in the fuel vector has an uncertainty band. The uncertainty band represents the accumulated uncertainties (allowances) for the point to which it applies (e.g., see discussion for FIG. 9 below). The addition of the uncertainty band to the fuel vector creates the expanded fuel vector (the CG profile).

In one embodiment, the first step in establishing whether an aircraft is within prescribed limitations is to calculate the margin that exists between the zero fuel and takeoff conditions, including their corresponding uncertainty bands, and the applicable certified limits (certified envelope). In the case of the zero fuel condition, the forward zero fuel point is compared to the forward edge of the ZFW envelope. Similarly, the aft zero fuel point is compared to the aft edge of the ZFW envelope. The takeoff condition is subjected to the same process, in this case using the forward and aft edges of the takeoff envelope. If a violation occurs, it is reported to the operator (e.g., by a message or other indication on a display of a user terminal).

For the in-flight checks the allowances applicable to the flight envelope are applied to each point along the fuel curve. The resulting shifted fuel curve is then compared to the forward and aft flight limits at the corresponding weight. If a violation occurs, it is reported to the operator (e.g., by a message or other indication on a display of a user terminal). Note that the traditional allowance for fuel consumption (as used in prior approaches) is not considered; there is no need for such allowance if a separate assessment of envelope compliance is made for every point (e.g., every point for a defined incremental increase in weight) along the fuel vector. It should also be noted that in other embodiments there may be other weight-CG limitations that an aircraft manufacturer may establish or that may otherwise be used in creating the CG profile. In these other embodiments, the CG profile may have a shape that depends in part on these other limitations. Comparison of this shape (regardless of its particular or unique form) to flight limits is performed in general as described herein.

Figure 6:
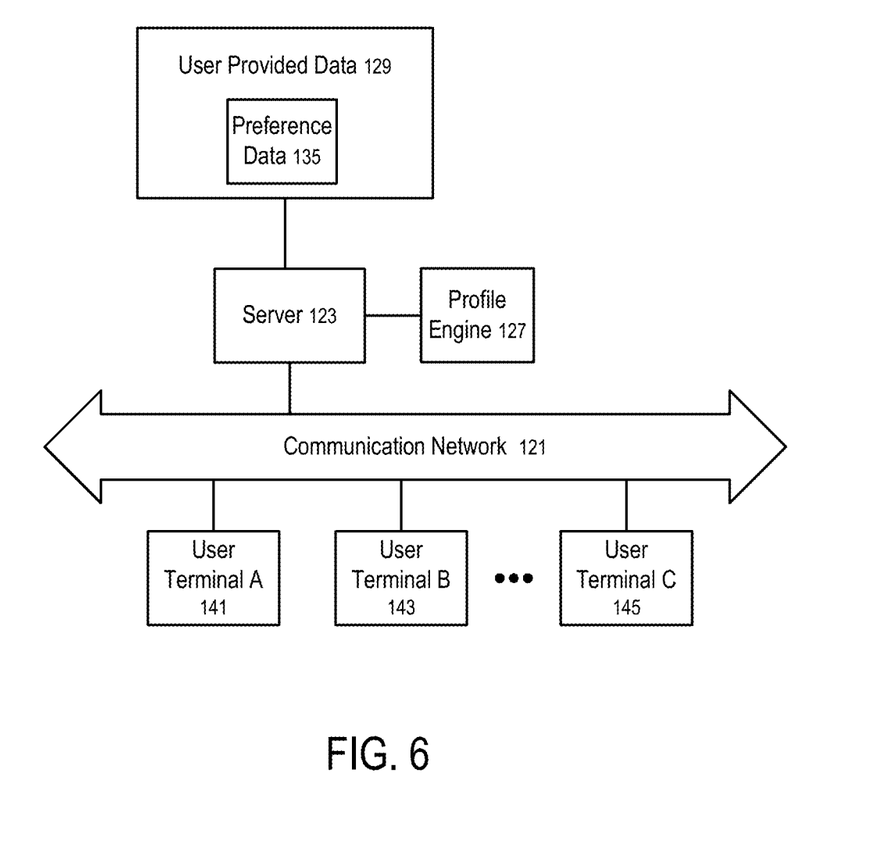
FIG. 6 shows a system to determine a CG profile for an aircraft prior to flight based on physical characteristics of the loaded aircraft, according to one embodiment.

FIG. 6 shows a system to determine a CG profile for an aircraft prior to flight based on physical characteristics of the loaded aircraft, according to one embodiment. In FIG. 6, the user terminals (e.g., 141, 143, . . . , 145) are used to access a server 123 over a communication network 121. The server 123 may be, for example, a web server (or other type of data communication servers) to communicate with the user terminals (e.g., 141, 143, . . . , 145). The server 123 is connected to a data storage facility to store user provided data 129, such as preference data 135, etc.

In FIG. 6, a profile engine 127 is connected to the server 123 to generate a CG profile as described herein, and to provide information regarding the CG profile and its comparison to flight limits to the user terminals (e.g., 141, 143, . . . , 145).

In FIG. 6, the users may use the terminals (e.g., 141, 143, . . . , 145) to customize the manner in which CG profiles are calculated (e.g., selection of inputs) and/or the manner in which violations and/or compliance results are provided when assessing suitability of a flight. For example, a violation may be reported to a user terminal when any point on, or portion of, the CG profile goes outside of the certified envelope. The extent of this excursion may be provided in a visual manner to a user on a user terminal. The effected flight condition (e.g., takeoff or in-flight) may also be reported along with the violation.

In one embodiment, the user terminal (e.g., 141, 143, . . . , 145) can also be used to submit some or all of the data inputs that will be used by profile engine 127 to determine the CG profile. The users may use the user terminal in some cases to associate data inputs with certain locations and/or routes for use by the profile engine 127.

Although FIG. 6 illustrates an example system implemented in client server architecture, embodiments of the disclosure can be implemented in various alternative architectures. For example, the server can be implemented via a peer to peer network of user terminals, where data is shared via peer to peer communication connections. In other approaches, the profile engine and all related processing can be performed on a single user terminal (e.g., located at a flight operation center at an airport).

In some embodiments, a combination of client server architecture and peer to peer architecture can be used, in which one or more centralized servers may be used to provide some of the information and/or services and the peer to peer network is used to provide other information and/or services. Thus, embodiments of the disclosure are not limited to a particular architecture.

Figure 7:
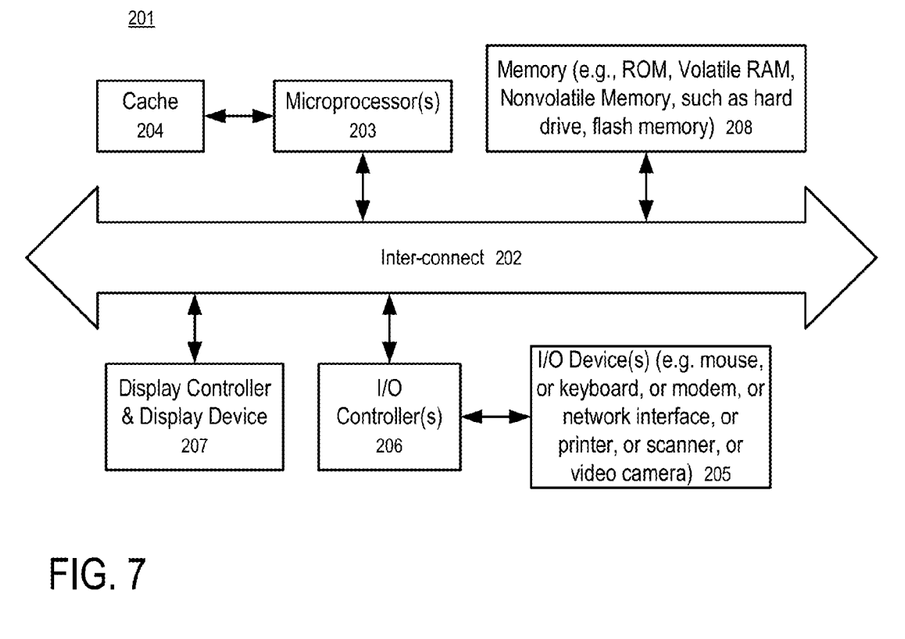
FIG. 7 shows a block diagram of a data processing system which can be used in various embodiments.

FIG. 7 shows a block diagram of a data processing system which can be used in various embodiments. While FIG. 7 illustrates various components of a computer system, it is not intended to represent any particular architecture or manner of interconnecting the components. Other systems that have fewer or more components may also be used.

In FIG. 7, the system 201 includes an inter-connect 202 (e.g., bus and system core logic), which interconnects a microprocessor(s) 203 and memory 208. The microprocessor 203 is coupled to cache memory 204 in the example of FIG. 7.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 7 is used to implement server 123, a profile engine, and/or other servers.

In one embodiment, a data processing system as illustrated in FIG. 7 is used to implement a user terminal. A user terminal may be in the form of a mobile device, personal digital assistant (PDA), a cellular phone, a notebook computer, a tablet, or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 8:
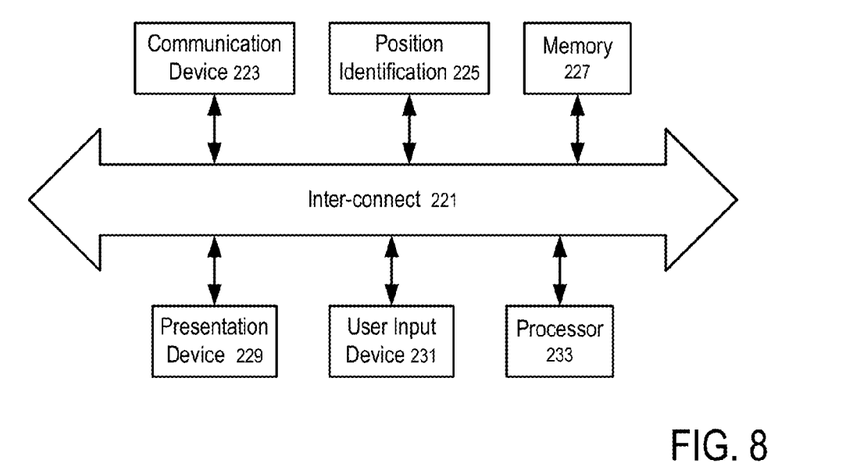
FIG. 8 shows a block diagram of a user device, according to one embodiment.

FIG. 8 shows a block diagram of a user device according to one embodiment. In FIG. 8, the user device includes an inter-connect 221 connecting the presentation device 229, user input device 231, a processor 233, a memory 227, a position identification unit 225 and a communication device 223.

In FIG. 8, the position identification unit 225 may be used to identify a geographic location for user data provided to server 123. The position identification unit 225 may include a satellite positioning system receiver, such as a Global Positioning System (GPS) receiver, to automatically identify the current position of the user device. Alternatively, an interactive map can be displayed to the user; and the user can manually select a location from the displayed map (e.g., locations associated with a planned flight).

In FIG. 8, the communication device 223 is configured to communicate with an server or network to provide data tagged with navigation data.

In one embodiment, the user input device 231 is configured to generate user data which is to be tagged with navigation information. The user input device 231 may include a text input device, a still image camera, a video camera, and/or a sound recorder, etc.

In one embodiment, the user input device 231 and the position identification unit 225 are configured to automatically tag data created by the user input device 231 with the navigation information identified by the position identification unit 225.

Various further embodiments are now discussed below. In a method according to one embodiment, a weight and center-of-gravity profile for an aircraft is determined prior to flight. An uncertainty band is determined for each of one or more plurality of points along a fuel vector for the planned flight. Each of the one or more points along the fuel vector is compared to a predetermined flight limit (e.g., an FAA certified envelope). This comparison is used to decide whether the profile is suitable for flight of the aircraft. If so, an indication is provided to a user (e.g., on a display or by a text message) that the profile is suitable and the aircraft is ready for flight. For example, there may be a different flight limit for each portion of flight (e.g., takeoff, in-flight, and landing). In one example, a single point of the fuel vector corresponds to a takeoff condition that is compared to a takeoff limit.

In one embodiment, the predetermined flight limit is a weight and center-of-gravity envelope, and each respective uncertainty band is based on a sum of forward allowances and a sum of aft allowances. These allowances are forward and aft relative to the respective given point on the fuel vector. For example, FIG. 9 shows an uncertainty band for a given point on the fuel vector, where the uncertainty band is determined based on accumulated forward and aft allowances, according to one embodiment. The outside edges of the uncertainty band define a portion of the perimeter of the CG profile.

In one embodiment, each of the forward allowances and each of the aft allowances is determined as an allowance for a respective physical characteristic of the aircraft due to a load as calculated by a shift in distance associated with the physical characteristic multiplied by a corresponding weight for the physical characteristic. For example, the physical characteristic may be cargo distribution, passenger seating distribution, passenger movement, water usage, cart movement, cabin crew movement, gear retraction, or flap deployment.

In one embodiment, the physical characteristic is cargo distribution, one of the aft allowances or forward allowances is a cargo allowance for the cargo, and the cargo allowance is calculated as a difference between a first moment for a uniform distribution of the cargo and a second moment for a non-uniform distribution of the cargo.

In one embodiment, the method further comprises determining a zero-fuel weight and a zero-fuel center of gravity for the aircraft, wherein the fuel vector includes the zero-fuel weight and the zero-fuel center of gravity. The predetermined flight limit comprises take-off parameters and in-flight parameters, wherein the take-off parameters are different from the in-flight parameters. The fuel vector comprises a first point corresponding to a take-off condition of the aircraft and a second point corresponding to an in-flight condition of the aircraft. Further, the comparing of the profile to the predetermined flight limit for the first point is based on the take-off parameters (i.e., the profile is compared to a flight limit for takeoff), and the comparing of the profile to the predetermined flight limit for the second point is based on the in-flight parameters (i.e., the profile is compared to a flight limit that applies during flight).

In one embodiment, the method further comprises, as the aircraft is being loaded for flight, receiving data for a physical characteristic of the aircraft; displaying, for the user, available margins for the profile relative to the predetermined limit; updating the respective uncertainty band for at least one of the points along the fuel vector based on the received data; and determining, based on the updated uncertainty band, whether the profile is suitable for flight of the aircraft.

In one embodiment, the profile is an area in a two-dimensional weight and center-of-gravity space having a perimeter, and portions of the perimeter located on each side of the fuel vector are determined by the uncertainty bands of the plurality of points of the fuel vector. In one example, the method further comprises causing a presentation of the area to the user on a display in a user interface. In another example, an indication that the profile is suitable for flight is provided to a user via a display of the computing apparatus and/or by sending a communication to a user terminal.

In one embodiment, the method further comprises receiving, via the computing apparatus, rules that define an operation of the aircraft when in flight, wherein at least one of the uncertainty bands of the plurality of points is determined based on the rules.

The calculation of an exemplary moment allowance is now provided. For example, an allowance for cabin crew in-flight movement (forward) is calculated as follows:

Operating assumption: One flight attendant (FA) moves from forward seat to the flight deck, and one flight attendant moves from aft seat to mid-cabin.

Allowance=$W_F[(x_{21}-x_{11})+(x_{22}-x_{12})]$ where $W_F$=FA weight
$x_{11}$=Forward FA seat location
$x_{21}$=Flight deck observer location
$x_{12}$=Aft FA seat location
$x_{22}$=Mid-cabin location In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some operations may be described in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   determining, by at least one processor, a weight and center-of-gravity profile for an aircraft prior to flight, the determining of the profile comprising determining a respective uncertainty band for each of a plurality of points along a fuel vector for the flight, wherein the fuel vector is based on fuel consumption of the aircraft during flight, and each uncertainty band is determined based on physical characteristics of the aircraft as loaded for the flight, and wherein each respective uncertainty band is based on a sum of forward allowances and a sum of aft allowances, each of the forward allowances and each of the aft allowances determined as an allowance for a respective physical characteristic of the aircraft due to a load as calculated by a shift in distance associated with the physical characteristic multiplied by a corresponding weight for the physical characteristic;
   as the aircraft is being loaded for flight, receiving data for a physical characteristic;
   updating the respective uncertainty band for at least one of the points along the fuel vector based on the received data;
   comparing, by the at least one processor, for each respective point of the points along the fuel vector, the profile to a flight limit;
   displaying, for a user, available margins for the profile relative to the flight limit;
   determining, by the at least one processor, based on the comparing whether the profile is suitable for flight of the aircraft; and
   providing, by the at least one processor, an indication for the user that the profile is suitable, wherein the indication for the user is provided by causing a presentation in a user interface on a display.

2. The method of claim 1, wherein the flight limit is a weight and center-of-gravity envelope.

3. The method of claim 1, wherein each of the physical characteristics is cargo distribution, passenger seating distribution, passenger movement, water usage, cart movement, cabin crew movement, gear retraction, or flap deployment.

4. The method of claim 1, wherein at least one of the physical characteristics is cargo distribution, one of the aft allowances or forward allowances is a cargo allowance for the cargo, and the cargo allowance is calculated as a difference between a first moment for a uniform distribution of the cargo and a second moment for a non-uniform distribution of the cargo.

5. The method of claim 1, further comprising determining a zero-fuel weight and a zero-fuel center of gravity for the aircraft, wherein the fuel vector includes the zero-fuel weight and the zero-fuel center of gravity.

6. The method of claim 1, wherein:
   the flight limit comprises take-off parameters and in-flight parameters, wherein the take-off parameters are different from the in-flight parameters;
   the fuel vector comprises a first point corresponding to a take-off condition of the aircraft and a second point corresponding to an in-flight condition of the aircraft; and
   the comparing of the profile to the flight limit for the first point is based on the take-off parameters, and the comparing of the profile to the flight limit for the second point is based on the in-flight parameters.

7. The method of claim 1, wherein the profile corresponds to an area in a two-dimensional weight and center-of-gravity space having a perimeter, and portions of the perimeter located on each side of the fuel vector are determined by the uncertainty bands of the plurality of points of the fuel vector.

8. The method of claim 7, further comprising causing a presentation of the area to the user.

9. The method of claim 1, further comprising receiving, by the at least one processor, rules that define an operation of the aircraft when in flight, wherein at least one of the uncertainty bands of the plurality of points is determined based on the rules.

10. A non-transitory computer-readable storage medium storing computer-readable instructions, which when executed, cause a computing system to:
   determine, by at least one processor, a weight and center-of-gravity profile for an aircraft prior to flight, the determining comprising determining a respective uncertainty band for each of one or more plurality of points along a fuel vector for the flight, wherein the fuel vector is based on fuel consumption of the aircraft during flight, and each uncertainty band is determined based on physical characteristics of the aircraft as loaded for the flight, and wherein each respective uncertainty band is based on a sum of forward allowances and a sum of aft allowances, each of the forward allowances and each of the aft allowances determined as an allowance for a respective physical characteristic of the aircraft due to a load as calculated by a shift in distance associated with the physical characteristic multiplied by a corresponding weight for the physical characteristic;
   as the aircraft is being loaded for flight, receiving data for a physical characteristic;
   updating the respective uncertainty band for at least one of the points along the fuel vector based on the received data;
   compare, by the at least one processor, for each respective point of the one or more points along the fuel vector, the profile to a flight limit;

displaying, for a user, available margins for the profile relative to the flight limit;

determine, by at least one processor, based on the comparing whether the profile is suitable for flight of the aircraft; and provide, by at least one processor, an indication for the user that the profile is suitable, wherein the indication for the user is provided by causing presentation on a display.

11. The non-transitory computer-readable storage medium of claim 10, wherein the profile is defined by dimensions of weight and center-of-gravity.

12. A system, comprising:
a display;
at least one processor; and
memory storing instructions configured to instruct the at least one processor to:
determine a weight and center-of-gravity profile for an aircraft prior to flight, the determining comprising determining a respective uncertainty band for each of a plurality of points along a fuel vector for the flight, and wherein each respective uncertainty band is based on a sum of forward allowances and a sum of aft allowances, each of the forward allowances and each of the aft allowances determined as an allowance for a respective physical characteristic of the aircraft due to a load as calculated by a shift in distance associated with the physical characteristic multiplied by a corresponding weight for the physical characteristic;

as the aircraft is being loaded for flight, receiving data for a physical characteristic;

updating the respective uncertainty band for at least one of the points along the fuel vector based on the received data;

compare, for each respective point of the points along the fuel vector, the profile to a flight limit;

present, via the display, available margins for the profile relative to the flight limit;

determine based on the comparing whether the profile is suitable for flight of the aircraft; and provide, on the display, an indication that the profile is suitable.

13. The system of claim 12, wherein:
the flight limit comprises take-off parameters and in-flight parameters, wherein the take-off parameters are different from the in-flight parameters;
the fuel vector comprises a first point corresponding to a take-off condition of the aircraft and a second point corresponding to an in-flight condition of the aircraft; and
the comparing of the profile to the flight limit for the first point is based on the take-off parameters, and the comparing of the profile to the flight limit for the second point is based on the in-flight parameters.

* * * * *